United States Patent
Lawlor et al.

(10) Patent No.: US 10,970,597 B2
(45) Date of Patent: Apr. 6, 2021

(54) METHOD, APPARATUS, AND SYSTEM FOR PRIORITY RANKING OF SATELLITE IMAGES

(71) Applicant: HERE GLOBAL B.V., Eindhoven (NL)

(72) Inventors: David Johnston Lawlor, Chicago, IL (US); Anish Mittal, San Francisco, CA (US); Zhanwei Chen, Richmond, CA (US)

(73) Assignee: HERE GLOBAL B.V., Eindhoven (NL)

( * ) Notice: Subject to any disclaimer, the term of this patent is extended or adjusted under 35 U.S.C. 154(b) by 85 days.

(21) Appl. No.: 16/419,897

(22) Filed: May 22, 2019

(65) Prior Publication Data

US 2020/0372289 A1 Nov. 26, 2020

(51) Int. Cl.
  *G06K 9/46* (2006.01)
  *G06K 9/62* (2006.01)
  *G06F 16/535* (2019.01)
  *G06K 9/00* (2006.01)

(52) U.S. Cl.
  CPC ........... *G06K 9/623* (2013.01); *G06F 16/535* (2019.01); *G06K 9/0063* (2013.01); *G06K 9/4604* (2013.01)

(58) Field of Classification Search
  CPC ............ G06K 9/0063; G06K 9/00637; G06K 9/00651; G06K 9/46; G06K 9/4604; G06K 9/468; G06K 9/469; G06K 9/6228; G06K 9/623; G06T 2207/30181; G06T 2207/30184; G06F 16/535
  See application file for complete search history.

(56) References Cited

U.S. PATENT DOCUMENTS

| | | | |
|---|---|---|---|
| 7,801,893 B2 | 9/2010 | Gulli' et al. | |
| 7,885,482 B2 | 2/2011 | Kansal | |
| 8,270,770 B1* | 9/2012 | Jin et al. | G06T 7/11 382/294 |
| 8,723,953 B2* | 5/2014 | Klomp et al. | H04N 7/18 348/144 |

(Continued)

OTHER PUBLICATIONS

Barb et al., "Associative Semantic Ranking of Satellite Images using PathFinder Network Scaling Ensemble Methods", 2012 IEEE International Geoscience and Remote Sensing Symposium, Jul. 2012, pp. 5289-5292. (Year: 2012).*

(Continued)

*Primary Examiner* — Andrew W Johns
(74) *Attorney, Agent, or Firm* — Ditthavong, Steiner & Mlotkowski

(57) ABSTRACT

An approach is provided for priority ranking of satellite images. The approach, for example, involves processing a plurality of images using a feature detector to determine a set of features on each image of the plurality of images. The approach also involves determining a count of feature correspondences between each pair of images of the plurality of images based on the set of features of said each image. The approach further involves computing a ranking of the plurality of images based on the count of features correspondences between said each pair of images. The approach further involves providing the ranking of the plurality of images as an output for selecting one or more images of the plurality of images for feature creation.

20 Claims, 16 Drawing Sheets

(56) References Cited

U.S. PATENT DOCUMENTS

2011/0085728 A1\* 4/2011 Gao et al. ............ G06K 9/6211
382/165
2017/0083546 A1 3/2017 Hieronymus et al.

OTHER PUBLICATIONS

Barb et al., abstract of "Associative Semantic Ranking of Satellite Images Using Pathfinder Network Scaling Ensemble Methods", Published in 2012 IEEE International Geoscience and Remote Sensing Symposium, Jul. 2012, 3 pages.

\* cited by examiner

METHOD, APPARATUS, AND SYSTEM FOR PRIORITY RANKING OF SATELLITE IMAGES

BACKGROUND

Modern location-based services and applications (e.g., autonomous driving) are increasingly demanding highly accurate and detailed digital map data (e.g., centimeter-level accuracy or better) across wide geographic areas. To achieve such levels of coverage, map service providers have relied on data (e.g., imagery) collected from a variety of sources including satellites. With advanced, efficient, and cost-effective remote sensing acquisition systems and increased number of satellites in orbit, the amount of satellite data has increased dramatically. Map service providers can identify common semantic features (e.g., lane markings, signs, etc.) across the satellite image views for map making, localization, and/or other similar location-based services. Since satellite imagery covers vast swaths of areas they can be used for derivation of different kinds of features on the earth surface at a city scale without the need to commission a fleet of vehicles. Some satellite images are better candidates for derivation of features than others. However, ranking the individual satellite images presents significant technical challenges because of the amount of data that has to be processed.

SOME EXAMPLE EMBODIMENTS

Therefore, there is a need for an approach for priority ranking of satellite images.

According to one embodiment, a method comprises processing a plurality of images using a feature detector to determine a set of features on each image of the plurality of images. The method also comprises determining a count of feature correspondences between each pair of images of the plurality of images based on the set of features of said each image. The method further comprises computing a ranking of the plurality of images based on the count of features correspondences between said each pair of images. The method further comprises providing the ranking of the plurality of images as an output for selecting one or more images of the plurality of images for feature creation.

According to another embodiment, an apparatus comprises at least one processor, and at least one memory including computer program code for one or more computer programs, the at least one memory and the computer program code configured to, with the at least one processor, cause, at least in part, the apparatus to process a plurality of images using a feature detector to determine a set of features on each image of the plurality of images. The apparatus is also caused to determine a count of feature correspondences between each pair of images of the plurality of images based on the set of features of said each image. The apparatus is further caused to compute a ranking of the plurality of images based on the count of features correspondences between said each pair of images. The apparatus is further caused to provide the ranking of the plurality of images as an output for selecting one or more images of the plurality of images for feature creation.

According to another embodiment, a non-transitory computer-readable storage medium carrying one or more sequences of one or more instructions which, when executed by one or more processors, cause, at least in part, an apparatus to process a plurality of images using a feature detector to determine a set of features on each image of the plurality of images. The apparatus is also caused to determine a count of feature correspondences between each pair of images of the plurality of images based on the set of features of said each image. The apparatus is further caused to compute a ranking of the plurality of images based on the count of features correspondences between said each pair of images. The apparatus is further caused to provide the ranking of the plurality of images as an output for selecting one or more images of the plurality of images for feature creation.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for priority ranking of satellite images are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
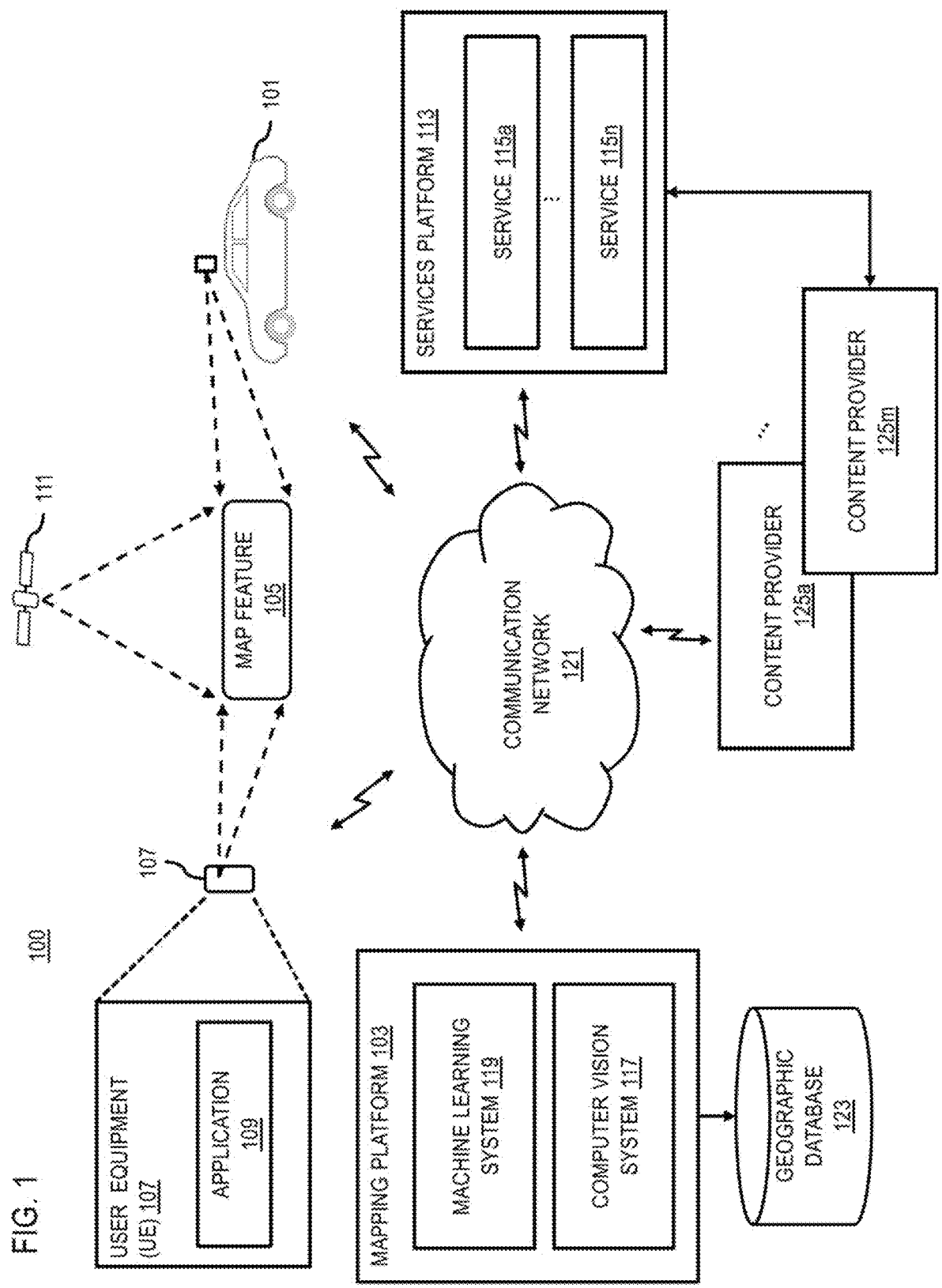
FIG. 1 is a diagram of a system capable of priority ranking of satellite images.

FIG. 1 is a diagram of a system capable of priority ranking of satellite images. As indicated above, many location-based services and applications rely on accurate map data. For example, automated driving is quickly becoming a reality following advances in machine learning, computer vision, and compute power. The ability to perceive the world with an accurate semantic understanding enables vehicles (e.g., an autonomous vehicle 101) to obey driving rules and avoid collisions. In addition to autonomous driving, digital maps in the form of models of the environment are needed for a wide range of automated applications including transportation, guidance, and search and rescue. As these perceptual abilities have improved, so too has the need for highly accurate and up-to-date maps. Path planning, for instance, requires knowledge of what to expect beyond a vehicle 101's perceptual horizon, and driving in complicated urban environments with many occluding objects requires knowledge of what cannot be detected by onboard sensors.

In response, map service providers are creating the most accurate and up-to-date high-resolution map for automated driving (e.g., a geographic database 105). Different sources of raw data (e.g., image data) can be exploited to make a map. For example, top down sources, like satellite, aerial and drone images, which are accurate photographs of the Earth's surface from a top down perspective, can be used to precisely determine the location of roads, and other features (e.g., map feature 105) on the Earth. Satellite imagery can be more useful in map creation because the satellite imagery covers vast swaths of areas. To obtain similar such data at the ground level would require commissioning a fleet of vehicles. Due to more advanced, efficient, and cost-effective remote sensing acquisition systems and increased number of satellites in orbit, the amount of satellite images has increased dramatically.

To facilitate and/or monitor the accuracy of digital map data stored in the geographic database 105, map service providers can designate ground control points. In one embodiment, ground control points are defined as identifiable points on the Earth's surface that have precise location (e.g., in the form of <Latitude, Longitude, Elevation>) associated with them. These points play a vital role in being able to measure the quality and correction of different data sources. Since image data is georeferenced (e.g., have camera positions associated with them), the map features detected from the imagery will also have associated 3D positions and hence can be utilized for the map making process. In one embodiment, feature correspondences across different sources enables aggregating maps made from different sources for better accuracy and more completeness. They could also help with the correction of one source using the other, depending on the relative correctness of the sources.

Filtering the individual satellite images presents significant technical challenges due to the amount of data that has to be processed. Traditional sorting methods of satellite images require too much processing power or fail to produce a dynamic ranking of the satellite images. Accordingly, map service providers face significant technical challenges to develop an intelligent task-based method of ranking satellite images.

To address these problems, the system 100 of FIG. 1 introduces priority ranking of satellite images. In one embodiment, the system 100 can use a feature detector to determine the features on each image in a set of satellite images, where the set of satellite images corresponds to a region of interest. The system 100 can use a feature corresponder to determine a count of features shared between each pair of satellite images in the set of satellite images. The system 100 can then use a ranking module to determine the rank of each satellite image in the set of images based on the count of features correspondences determined by the feature corresponder. The system 100 can use the rankings determined by the ranking module as an output for designating one or more of the satellite images for feature creation.

Images in this embodiment refer to satellite images, but a photo or video from any source (e.g., top-down source, ground-level source, etc.) may be used to generate priority rankings. In other words, it is contemplated that satellite images refer to a broader category of images than those strictly taken from a satellite. Accordingly, as used herein, references to either images or satellite images is intended to also refer to the other un-mentioned term (e.g., image or satellite image) alone or in combination.

Figure 2:
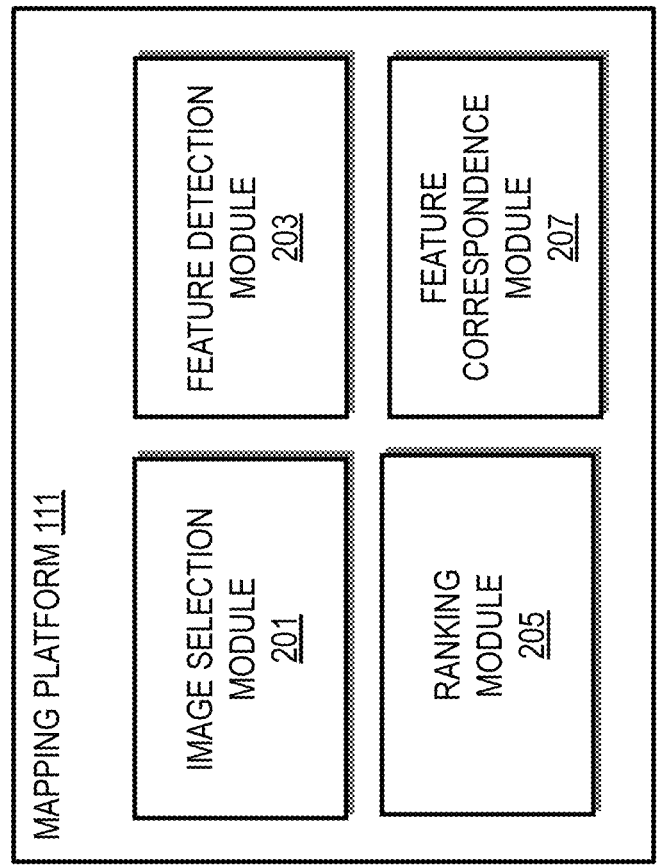
FIG. 2 is a diagram of components of a mapping platform capable of priority ranking of satellite images.

In one embodiment, as shown in FIG. 2, the mapping platform 103 includes one or more components for priority ranking of satellite images, according to the various embodiments described herein. It is contemplated that the functions of these components may be combined or performed by other components of equivalent functionality. In this embodiment, the mapping platform 103 includes an image selection module 201, feature detection module 203, ranking module 205, and a feature correspondence module 207. The above presented modules and components of the mapping platform 103 can be implemented in hardware, firmware, software, or a combination thereof. Though depicted as a separate entity in FIG. 1, it is contemplated that the mapping platform 103 may be implemented as a module of any other component of the system 100 (e.g., a component of the services platform 113, services 115a-115n (also collectively referred to as services 115), vehicle 101, UE 107, application 109 executing on the UE 107, etc.). In another embodiment, one or more of the modules 201-207 may be implemented as a cloud-based service, local service, native application, or combination thereof. The functions of the mapping platform 103 and the modules 201-207 are discussed with respect to FIGS. 3-8 below.

Figure 3:
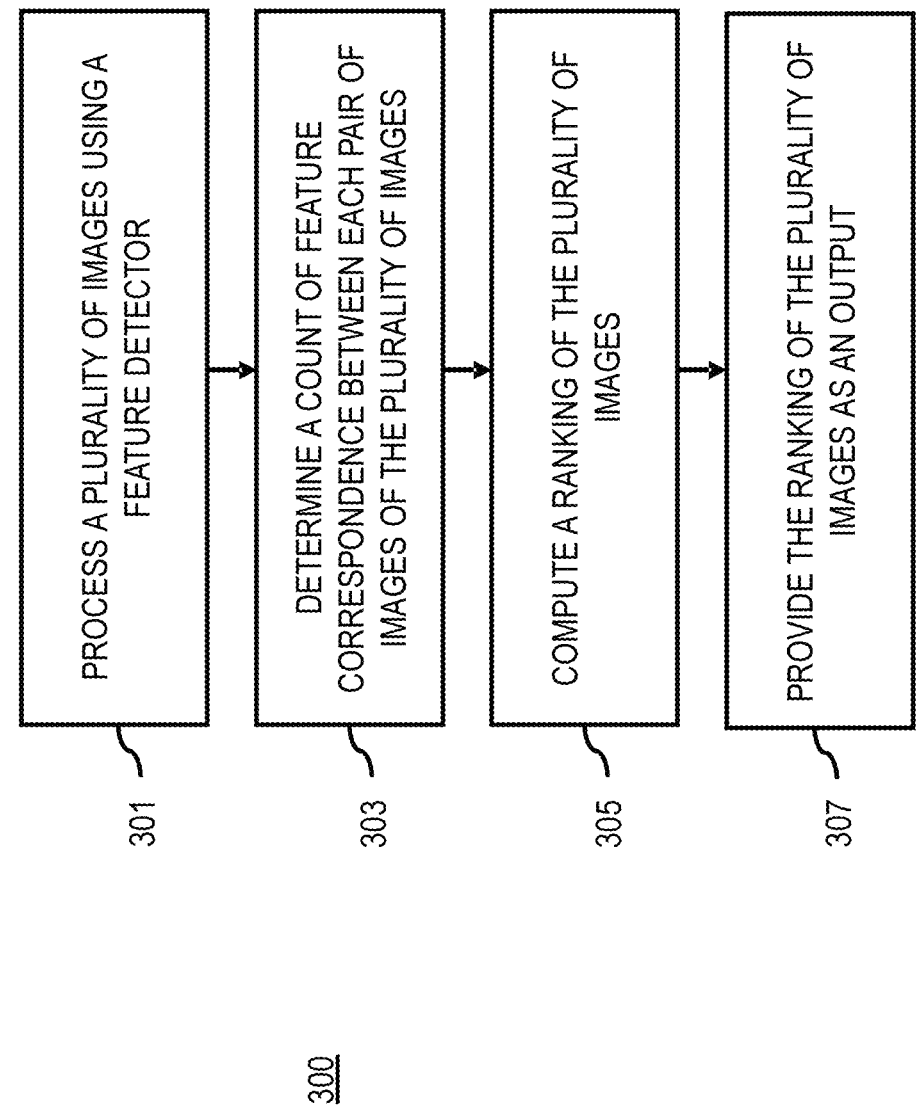
FIG. 3 is a flowchart of a process for priority ranking of satellite images.
Figure 11:
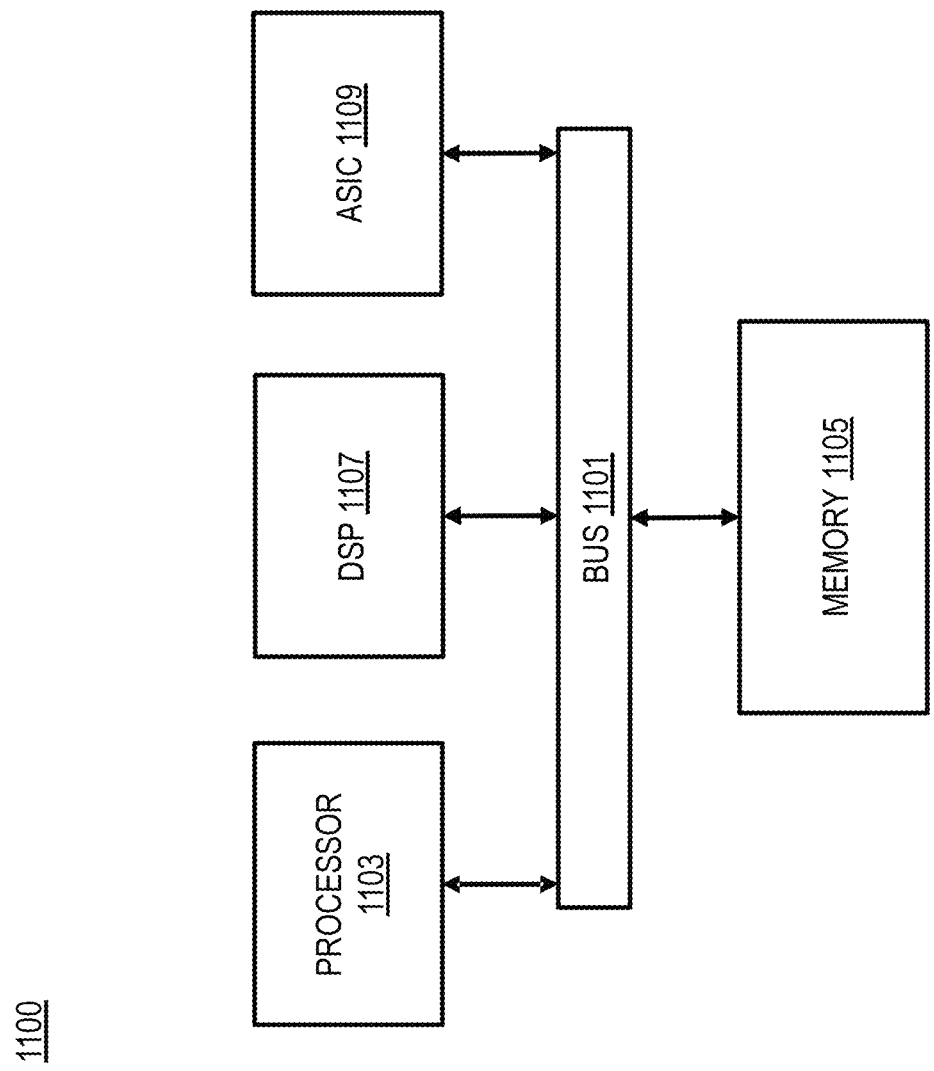
FIG. 11 is a diagram of a chip set that can be used to implement an embodiment.

FIG. 3 is a flowchart of a process for priority ranking of satellite images, according to one embodiment. In various embodiments, the mapping platform 103 and/or any of the modules 201-207 may perform one or more portions of the process 300 and may be implemented in, for instance, a chip set including a processor and a memory as shown in FIG. 11. As such, the mapping platform 103 and/or the modules 201-207 can provide means for accomplishing various parts of the process 300, as well as means for accomplishing embodiments of other processes described herein in conjunction with other components of the system 100. Although the process 300 is illustrated and described as a sequence of steps, its contemplated that various embodiments of the process 300 may be performed in any order or combination and need not include all of the illustrated steps.

In step 301, the image selection module 201 interacts with the feature detection module 203 to process a plurality of images. To begin, an area of interest (city, region, town, ect.) is selected. The image selection module 201 selects or receives a set of images (e.g., from a user; system administrator; image database—e.g., provided by the services platform 113, services 115, or content providers 125; etc.) of the area of interest to be indexed. The image selection module 201 selects a first image, of the set of images, that has an annotated location of at least one feature. The first image is taken by a first camera (e.g., with known camera location, camera pose/pointing direction, optical characteristics, and/or any other camera parameter for performing location triangulation). The first image can be part of a set of multiple images (e.g., two or more) that are labeled to indicate a shared feature, and are to be processed by the feature detection module 203. Annotated locations refer to pixel locations in the first image that have been labeled or annotated as corresponding to the one or more features. Features refer to any feature that is photo-identifiable in the image including, but not limited to, physical features on the ground that can be used as possible candidates for ground control points. In other words, it is contemplated that features refer to a broader category of photo-identifiable features than just ground control points. Accordingly, as used herein, references to either feature or ground control point individually is intended to also refer to the other un-mentioned term (e.g., feature or ground control point) alone or in combination.

In another embodiment, the first image does not have an annotated location or locations of one or more features (e.g., has not been previously labeled to indicate the feature locations within the image). In such an embodiment, the feature detection model 203, upon receiving or selecting the image, determines the annotated location or locations of the one or more features. After the feature detection module 203 determines the annotated location or locations of the one or more features for the first image, the feature detection module repeats the process for every image in the set of images of the area of interest designated for indexing. The feature detection module 203 stores the location of the annotated location or locations of the one or more features of each processed image. The feature detection model 203 can use a machine-learning algorithm or equivalent to determine the annotated location or locations of the one or more features. The machine-learning algorithm can use one or more designated properties in classifying the one or more features in the image and/or determining the annotated location or locations of the classified or detected features. For example, the designated properties for selecting features such as a ground control point can include but are not limited to: (1) having a consistent definition, (2) being uniquely identifiable, (3) having spatial sparsity, (4) having curvilinear geometry intersection features and/or (5) being generalizable across different geographic regions. Curvilinear geometry intersection features are features defined by lines, markings, structures, etc. that are found at roadway intersections. The features can also include any geometric arrangement of the features (e.g., line intersections, angles, boundaries, etc.).

In step 303, the feature correspondence module 203 determines a count of feature correspondence between each pair of images in the designated set of images. The feature correspondence module 203 selects or receives a first and second annotated image, from the set of image discussed above. The feature correspondence module 203 determines which, if any, features in the first image corresponds to features in the second image. A number of different methods may be used to determine the count of feature correspondence between a pair of images. For example, the feature correspondence module 203 can determine feature correspondence between a first image and a second image based on camera geometry. Camera geometry includes image metadata such camera pose data (e.g., pointing direction of the camera) and/or camera technical specifications (e.g., focal length, camera lens, aperture, exposure, etc.) relating to the camera, which took the image. In other words, using the pixel locations of a feature in two images and the camera geometry of the camera taking the image, the feature correspondence module 203 can determine the number of shared features between two images.

The feature correspondence module 203 repeats the process for every pair of images in the designated set. For example, if there were three images in the set the feature correspondence would first compare the first image and the second image, then the first image and the third image, then the second image and the third image. In one embodiment the feature correspondence module 203 is able to determine a count of feature correspondence even when a one-to-one correspondence might not be possible, due to occlusions or misfiring of the feature detection module 203.

In step 305, the ranking module 205 computes the rankings for each image in the set of images. The ranking module 205 creates a graph where the nods represent each individual image, in the set of images, and the edges represent a shared feature. The ranking module 205 computes the ranking of each image based on the sum of all outgoing edges. For example, if a node (representing a first image) has four edges (representing shared feature correspondence with four other images) it would be ranked higher than another node (representing a second image) with two edges (representing shared feature correspondence with two other images). The ranking of the images is dependent on the weight given to the edges of the graph. Different weights could be given depending on confidence of the feature correspondence or the number of shared features between two images. As new images are added to the set of images, the process is repeated and the rankings are recalculated. In one embodiment, the first iteration of the process for priority ranking of satellite images has uniform weights, while each subsequent iteration can base the weight of the edges on the rank of the image to which the edge is being connected.

In step 307, the ranking module 205 provides the ranking of the images as an output. For example, the ranking module 205 can provide the output to help determine future feature creation. This is because the highest ranked images will generally have the highest number of shared features, meaning the features identified in the highest ranked images are exemplarily examples of quality features and are likely to be substantiated by other images. Further, the output can provide a guide for future image capture. For example, a particular time of day may lead to more useful satellite images.

Figure 4:
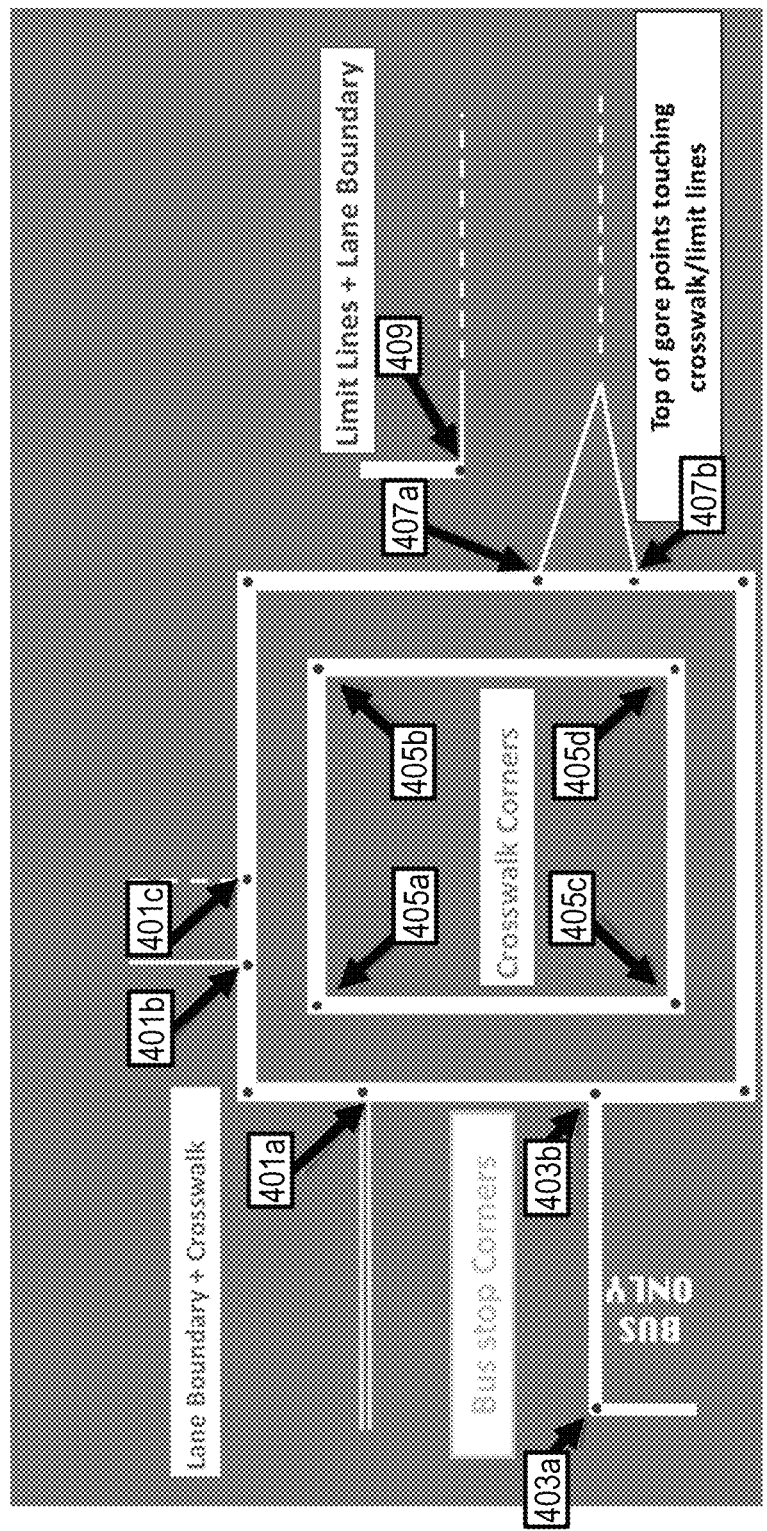
FIG. 4 is a diagram illustrating example image data from different sources depicting the same feature, according to one embodiment.

As discussed above, one example of a feature that is labeled in images includes but is not limited to ground control points. FIG. 4 is a diagram illustrating example intersection features that can be found at a typical intersection, according to one embodiment. The example of FIG. 4 illustrates a schematic drawing of a typical intersection 400 at which intersection features created by various geometries of the lane lines, crosswalks, bus stops, and/or any other identifiable object or marking found at the intersection 400. An intersection refers, for instance, to a geographic area at which two or more road segments intersect, converge, and/or diverge. As shown, intersection features in the category of curvilinear geometry include but are not limited to:

(1) Points 401a-401c at which a lane boundary (e.g., lane line or marking) meets a crosswalk;
(2) Points 403a and 403 that correspond to the corners of road markings indicating a bus stop;
(3) Points 405a-405d that correspond to the corners of a crosswalk;
(4) Points 407a and 407b that are the top of gore points touching a crosswalk or limit lines (e.g., lines designating the limit or boundaries of other features such as lanes); and
(5) Point 409 at which a limit line meets a lane boundary.

The intersection features identified above typically meet the criteria or properties for being classified as ground control points.

In one embodiment, the intersection feature/ground control point is selected so that the intersection feature is uniquely identifiable from among other intersection features from the category of curvilinear geometry intersection features (e.g., see designated property item (2) above). In other words, a single feature should only be classified under one feature definition category. For example, if a feature that is classified as "a lane boundary with a crosswalk" should also not satisfy the definition for being a "gore point" or vice versa.

In another embodiment, the intersection feature is selected based on determining that the intersection feature has a spatial sparsity that meets a sparsity criterion (e.g., see designated property item (3) above). Features that repeat often within a designated area (i.e., not sparse or appear in numbers greater than the sparsity threshold) are not well suited as ground control points because they can be more difficult to uniquely identify and match as against known ground control points. For example, features such as dashes of a lane line, stripes in a crosswalk, multiple line paint intersections in restricted zones, zebra stripes, etc. that repeat often over small distances can be poor ground control point candidates.

Figure 5A:
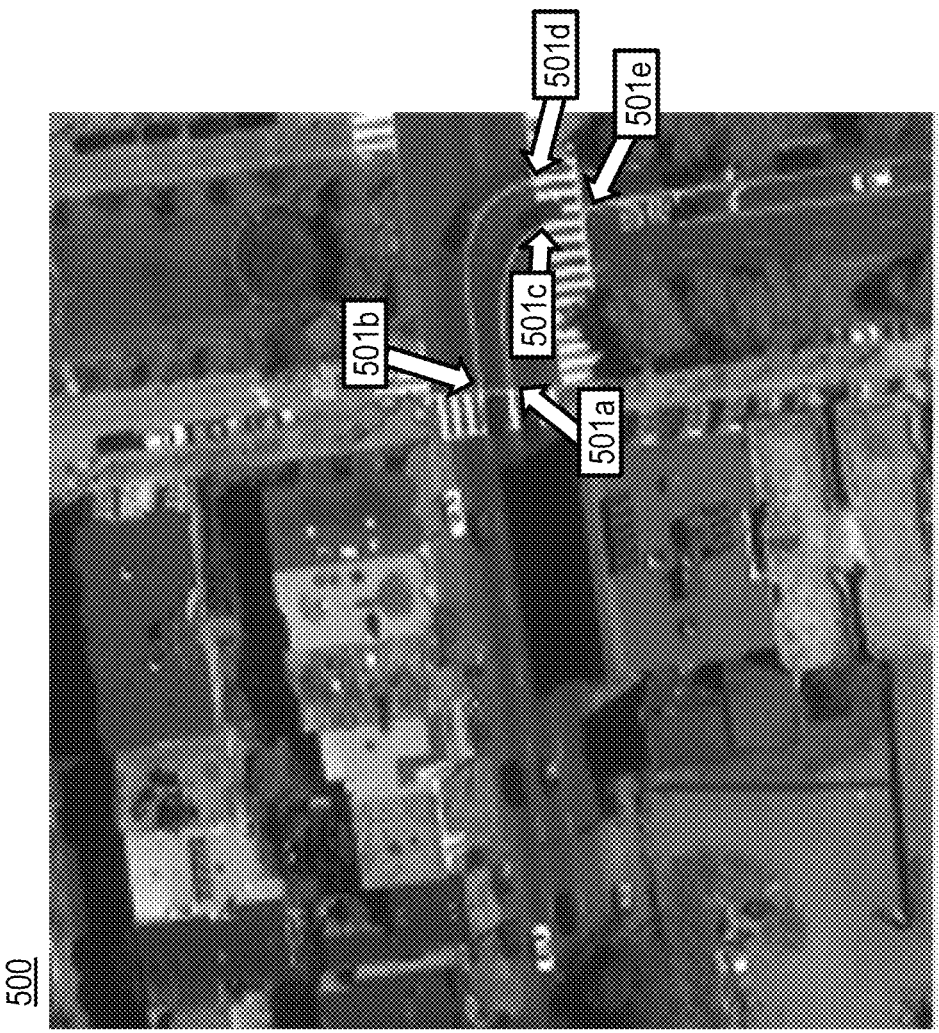
FIGS. 5A-5C are diagrams illustrating example imagery of intersection features, according to one embodiment.
Figure 5B:
Figure 5C:
Figure 6B:
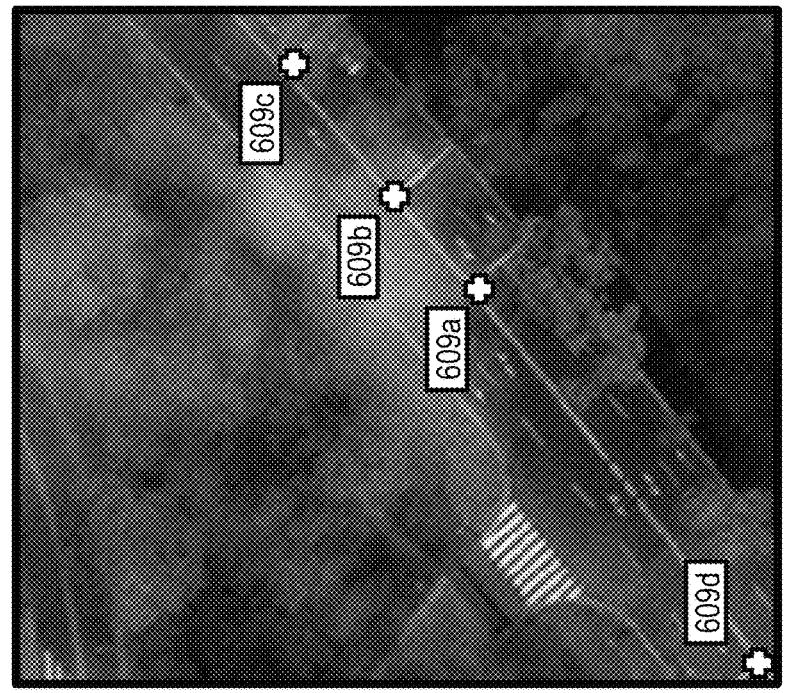
FIGS. 6A-6D are diagrams illustrating examples of satellite imagery of intersection features, according to one embodiment.
Figure 6A:
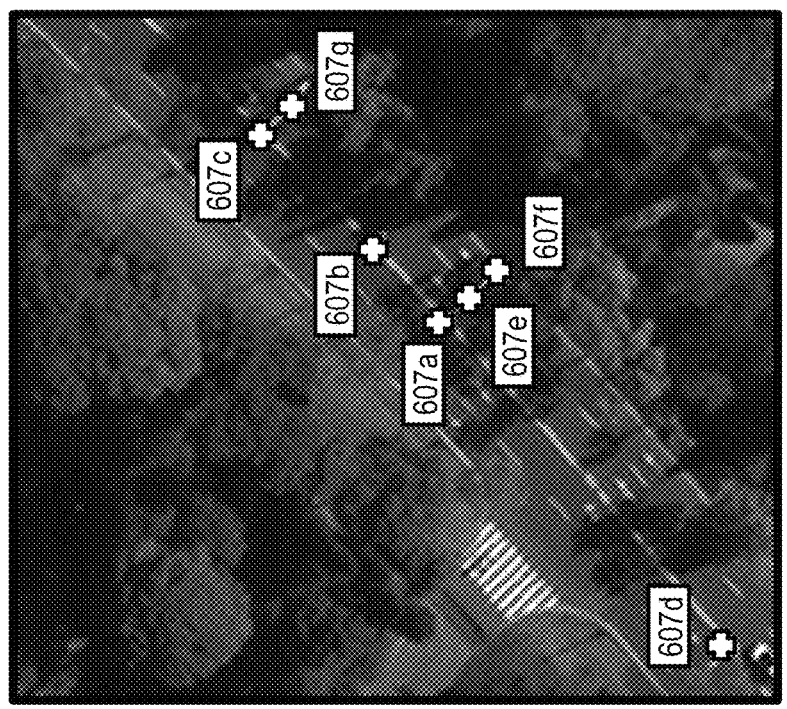
Figure 6C:
Figure 6D:
Figure 7B:
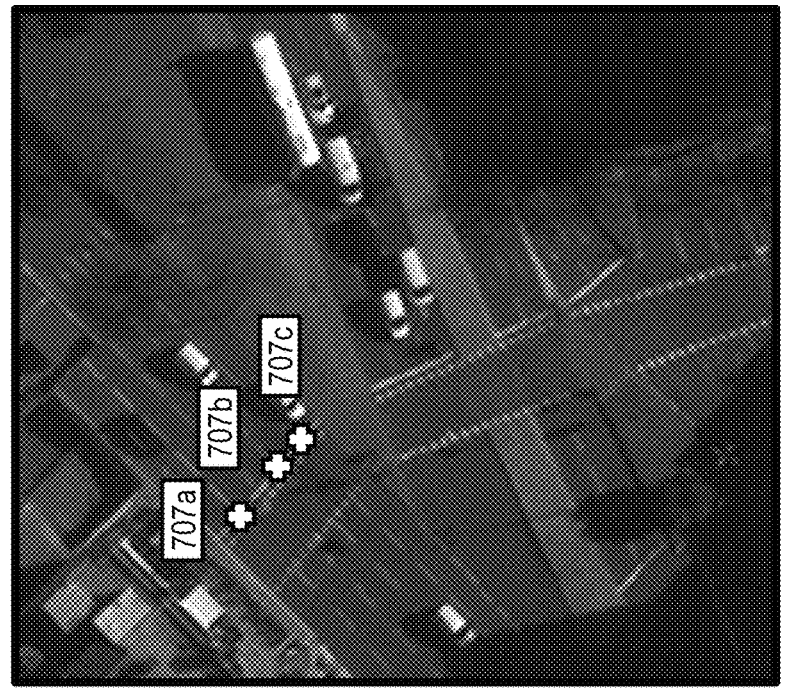
FIGS. 7A-7D are diagrams illustrating examples of satellite imagery of intersection features, according to one embodiment.
Figure 7A:
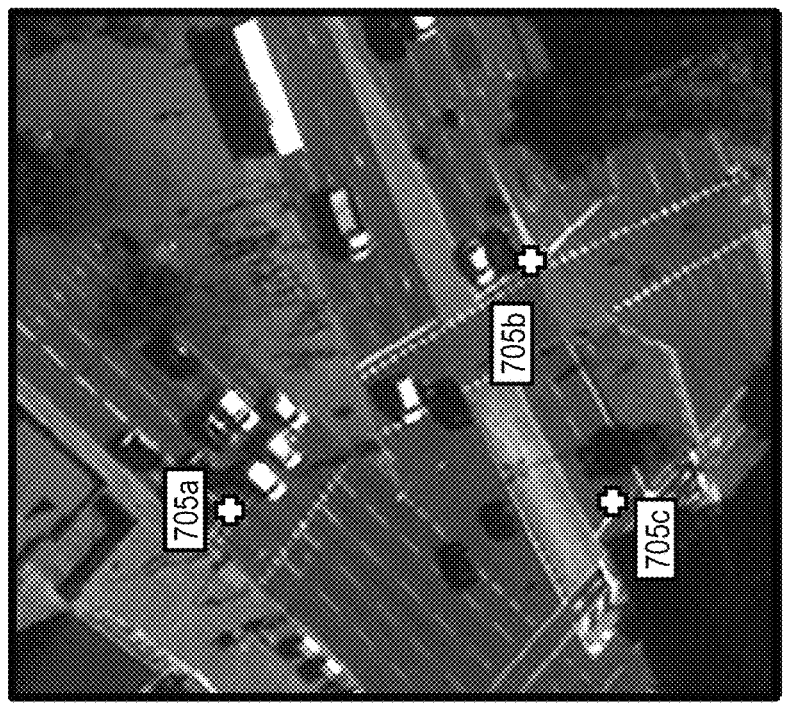
Figure 7C:
Figure 7D:
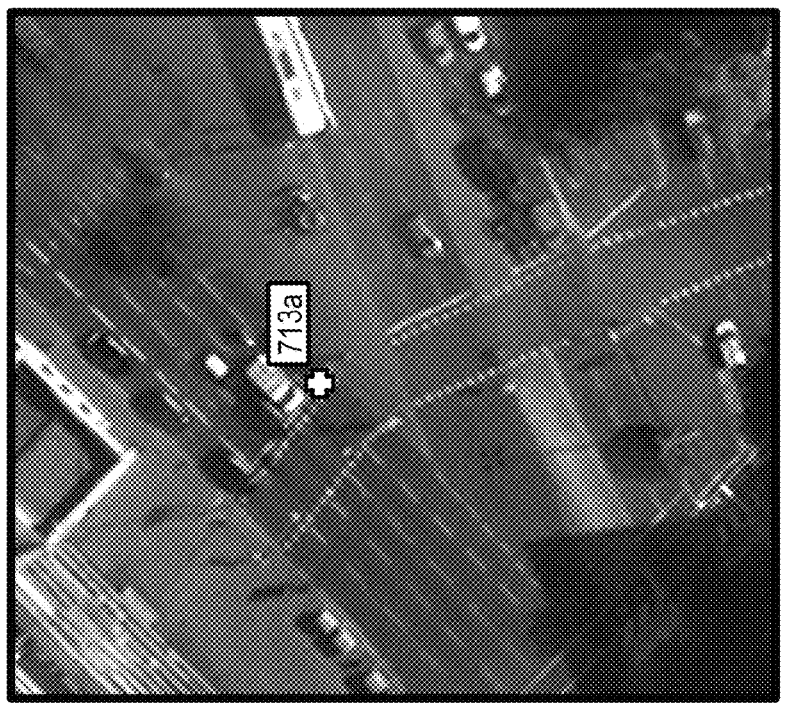

FIGS. 5A-5C illustrate example imagery of some of the intersection features illustrated in FIG. 4, according to one embodiment. For example, FIG. 5A illustrates top down imagery 500 that depicts ground control points 501a-501e at which a lane boundary meets a crosswalk. FIG. 5B illustrates to-down imagery 520 that depicts ground control points 521a and 521b that are crosswalk corners. FIG. 5C illustrates top down imagery 540 that depicts ground control points 541a and 541b at which a limit line meets a lane line. Each of the ground control points illustrated in FIGS. 5A-5C are an intersection features from a category of curvilinear geometry intersection features that are a visible feature of a roadway intersection (e.g., visible from a top down imagery perspective).

After selecting the features that are to be designated as ground control points, the feature detection module 203 can label and/or retrieve a plurality of ground truth images depicting the intersection feature. In one embodiment, the plurality of ground truth images is labeled with known pixel location data of the intersection as respectively depicted in each of the plurality of ground truth images. The known pixel location data indicate which pixel(s) of a ground truth image correspond to ground control points that are present in the image. As previously described, the known pixel location data can be used to determined pixel correspondences between multiple images to determine real world three-dimensional locations of the ground control point (e.g., intersection feature) comprising a latitude, longitude, and elevation. The ground truth images can also include multiple images of the same ground control point or learnable feature (e.g., captured at different times, from different sources, etc.).

In one embodiment, to determine or label pixel location data, the feature detection module 203 can process the images using image recognition or equivalent to identify the pixels of each image corresponding to the selected intersection features/ground control points. In other words, following the identification of candidate feature points in several top down images, corresponding image pixel locations are identified. In one embodiment, for each real-world feature (e.g., line intersection), the corresponding pixel coordinates in two or more images are recorded, creating a pixel correspondence of the form $\{(u_1, v_1), (u_2, v_2), \ldots\}$ or equivalent. Here, u and v are pixel locations of the same physical object or feature depicted in the images (e.g., pixel locations along the x and y axis respectively of a pixel grid comprising the image), and the subscript indicates in which image the feature is labeled.

FIGS. 6A-6D are diagrams illustrating examples of satellite imagery of intersection features, according to one embodiment. In this example, 6A represents a first top-down image 601, 6B represents a second top-down image 603 of the same intersection at a different time, 6C represents a third top-down image 611 of the same intersection at a different time, and 6D represents a forth top-down image 613 of the same intersection at a different time. The four images make up a set of top-down images. The feature detection model 203 determines the annotated location or locations of the features of each image in the set. The first image 601 has seven features 607a-g, the second image 603 has four features 609a-d, the third image 611 has one feature 615a, while the forth image 613 has no detectable features. Traditional methods may sort these four images based on the number of detectable features and determine the highest ranked image is the first image 601 because it has the most features. However, to be able to find 3D locations for features through triangulation, features needs to be observed by more then one image. The first image 601 has a total of seven features, but the fifth feature 607e, sixth feature 607f, and seventh feature 607g are not found in any other images in the set. Meaning these features 607e-607g cannot be used to find 3D locations of the features because the features 607e-607f cannot be matched to any other image. Therefore ranking the first image 601 as the best image would be an inaccurate ranking.

The feature correspondence module 203 and ranking module 205 can determine that the first image 601 and the second image 603 should be equally ranked. The feature correspondence module 203 determines a count of feature correspondence between each pair of images. To begin, the feature correspondence module 203 can select the first image 601 and second image 603, and determine the count of shared features. Next, the feature correspondence module 203 determines the count of shared features between the first image 601 and the third image 611, then the count of shared features between the first image 601 and the forth image 613. The feature correspondence module 203 repeats this process for each pair of images.

Through this process, the feature correspondence module 203 can determine that the first feature 607a, second feature 607b, third feature 607c, and forth feature 607d of the first image 601, are found in other images. For example, the second image 603 has a first feature 609a, which matches the first feature 607a in the first image 601. Similarly, the second feature 609b, third feature 609c, and forth feature 609d in the second image 603 match the second feature 607b, third feature 607c, and forth feature 607d in the first image. Because the first image 601 and the second image 603 both have a total of four matched features, the ranking module 205 can determine that their ranking should be equal.

FIGS. 7A-7D are diagrams illustrating examples of satellite imagery of intersection features, according to one embodiment. In this example, 7A represents a first top-down image 701, 7B represents a second top-down image 703 of the same intersection at a different time, 7C represents a third top-down image 709 of the same intersection at a different time, and 7D represents a forth top-down image 711 of the same intersection at a different time. The four images make up a set of top-down images. The feature detection model 203 can determine the annotated location or locations of the features of each image in the set. The first image 701 has three features 705a-c, the second image 703 has three features 707a-c, the third image 709 has one feature 713a, while the forth image 711 has two features 715a-b. Traditional approaches would rank the images based on the number of features, meaning the first image 701 and second image 703 would be ranked the highest.

The current invention uses the feature correspondence module 203 to determine a count of feature correspondence between each pair of images in the designated set of images. The feature correspondence module 203 can select the first image 701 and second image 703, from the set of image. The feature correspondence module 203 can determine the first feature 705a in the first image 701 corresponds to first feature 707a in the second image 703. The feature correspondence module 203 can determine that there are no other features shared between the first image 701 and second image 703. Next the feature correspondence module 203 can select the first image 701 and third image 709 and can determine that there are no features shared between the first image 701 and third image 709. Next the feature correspondence module 203 can select the first image 701 and forth image 711 and can determine that there are no features shared among the first image 701 and forth image 711. Using this information the ranking module 205 can rank the first image 701 as only having one shared feature 705a. The feature correspondence module 203 can repeat the process described for each image. The feature correspondence module 203 can determine that the second image 703 has three shared features. The second image's 703 first feature 707a matches with the first image's 701 first feature 705a while the second image's 703 second feature 707b and third feature 707c match with the forth image's 711 first feature 715a and second feature 715b. Accordingly the ranking module 205 can give the second image 711 a higher ranking than the first image 709 because the second image 711 has more shared features.

Figure 8:
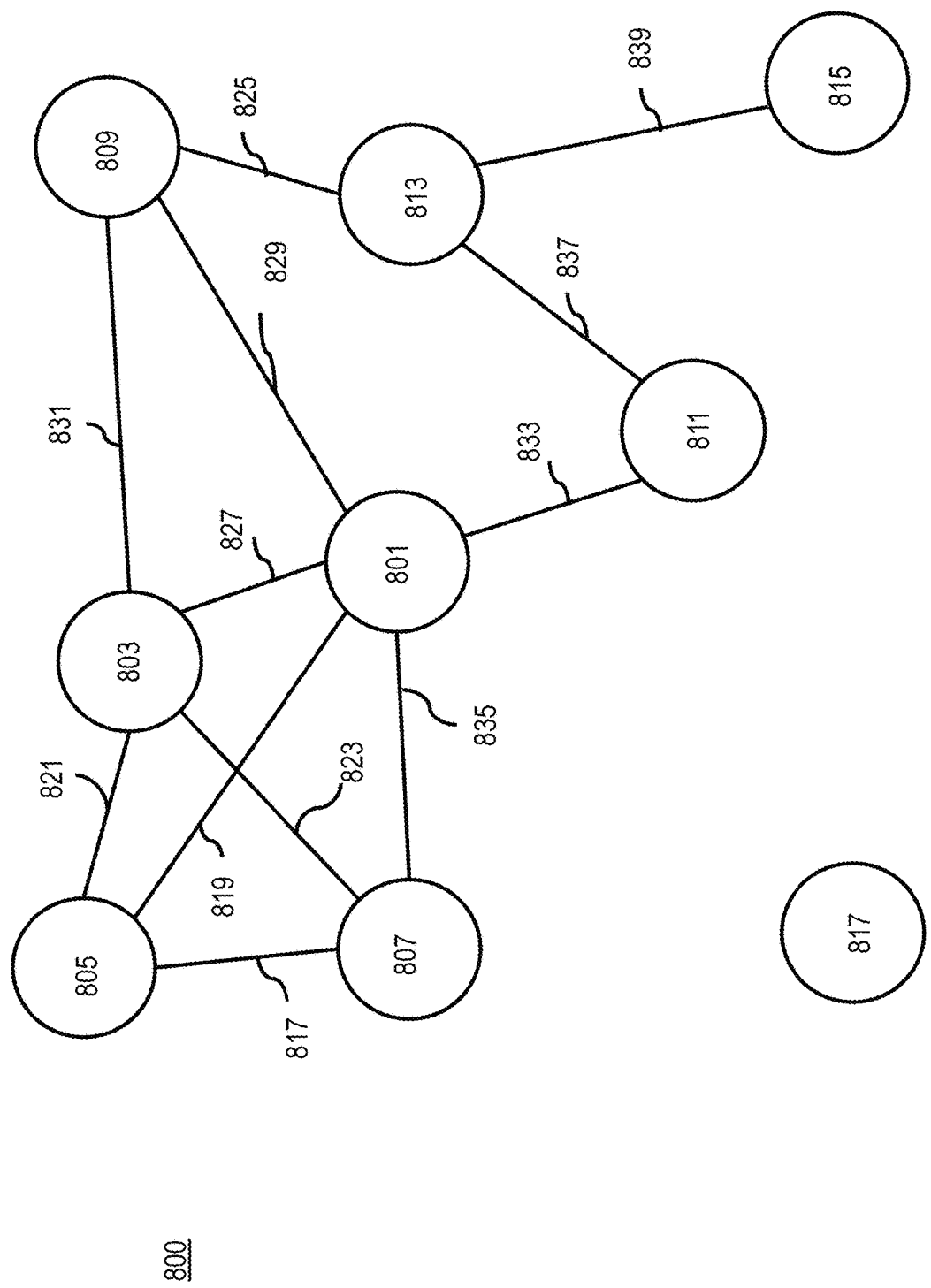
FIG. 8 is a diagram illustrating a graph of priority rankings of satellite images, according to one embodiment.

FIG. 8 is a diagram illustrating a graph of priority rankings of satellite images, according to one embodiment. The ranking module 205 can generate a graph 800 where the nodes represent different images and the edges between the nodes represent a shared feature. In the graph 800 the first node 801 would be ranked the highest because it has five different edges. Each edge correspondence to a shared feature between the two nodes. For example, the first edge 827 represents that the first image represented by the first node 801 shared a feature with a second image represented by a second node 803. The lowest ranked image would be the third image, represented by the third node 817. The third node has no edges, indicating it does not share any features with any image in the set of images.

In one embodiment, the ranking module 205 can weight the edges based on the rank of the image it is connecting to. For example, a fifth image represented by a fifth node 811 only has a first edge 833 and a second edge 837. While a sixth image represented by a sixth node 813 has a first edge 824, second edge 837, and a third edge 839. The first node 801 has five edges giving it a higher rank than any other node. Because the sixth node 813 has three edges, it would ordinarily be ranked higher than the fifth node 811, which only two edges. However because the fifth node 811 has a first edge 833 with the first node 801, which is highly ranked, the ranking module 205 can determine that the fifth node 811 is ranked higher than the sixth node 813.

In one embodiment, the ranking module 205 can weight the edges between nodes to indicate the number of shared features between two images. For example, if the first image represented by the first node 801 shared two features with a forth image represented by a forth node 809 the edge 829 between them, may indicate a higher ranking for each connected node 801, 809.

Returning to FIG. 1, as shown, the system 100 includes the mapping platform 103 for determining priority ranking of satellite images according to the embodiments described herein. For example, with respect to autonomous, navigation, mapping, and/or other similar applications, the mapping platform 103 can detect features in input images to provide location correction of sources based on feature correspondence, according to the various embodiments described herein. In one embodiment, the machine learning system 119 of the mapping platform 103 includes a neural network or other machine learning system to make predictions from machine learning models. For example, when the input to the machine learning model are images used for the embodiments described herein, the output can include pixel locations of photo-identifiable features that can be used to determine priority ranking of satellite images for location correction or other applications. In one embodiment, the neural network of the machine learning system 119 is a traditional convolutional neural network, which consists of multiple layers of collections of one or more neurons (which are configured to process a portion of an input image. In one embodiment, the receptive fields of these collections of neurons (e.g., a receptive layer) can be configured to correspond to the area of an input image delineated by a respective a grid cell generated as described above.

In one embodiment, the machine learning system 119 and/or the computer vision system 117 also have connectivity or access over a communication network 121 to a geographic database 123 which stores the imagery for different sources (e.g., with different views or perspectives), extracted features, features correspondences, derived maps, etc. generated according to the embodiments described herein. In one embodiment, the geographic database 123 includes representations of features and/or other related geographic features determined from feature correspondences to facilitate visual odometry to increase localization accuracy. In one embodiment, the machine mapping platform 103 has connectivity over a communication network 121 to the services platform 113 that provides one or more services 115. By way of example, the services 115 may be third party services and include mapping services, navigation services, travel planning services, notification services, social networking services, content (e.g., audio, video, images, etc.) provisioning services, application services, storage services, contextual information determination services, location-based services, information based services (e.g., weather, news, etc.), etc. In one embodiment, the services 115 uses the output of the mapping platform 103 (e.g., location corrected images, features, etc.) to localize the vehicle 101 or UE 107 (e.g., a portable navigation device, smartphone, portable computer, tablet, etc.) and/or provide services 115 such as navigation, mapping, other location-based services, etc.

In one embodiment, the mapping platform 103 may be a platform with multiple interconnected components. The mapping platform 103 may include multiple servers, intelligent networking devices, computing devices, components and corresponding software for providing parametric representations of lane lines. In addition, it is noted that the mapping platform 103 may be a separate entity of the system 100, a part of the one or more services 115, a part of the services platform 113, or included within the UE 107 and/or vehicle 101.

In one embodiment, content providers 125a-125m (collectively referred to as content providers 125) may provide content or data (e.g., including geographic data, parametric representations of mapped features, etc.) to the geographic database 123, the mapping platform 103, the services platform 113, the services 115, the UE 107, the vehicle 101, and/or an application 109 executing on the UE 107. The content provided may be any type of content, such as map content, textual content, audio content, video content, image content, etc. In one embodiment, the content providers 125 may provide content that may aid in the detecting and classifying of lane lines and/or other features in image data and determining feature correspondences. In one embodiment, the content providers 125 may also store content associated with the geographic database 123, mapping platform 103, machine learning system 119, computer vision system 117, services platform 113, services 115, UE 107, and/or vehicle 101. In another embodiment, the content providers 125 may manage access to a central repository of data, and offer a consistent, standard interface to data, such as a repository of the geographic database 123.

In one embodiment, the UE 107 and/or vehicle 101 may execute a software application 109 to capture image data or other observation data for determining priority ranking of satellite images according the embodiments described herein. By way of example, the application 109 may also be any type of application that is executable on the UE 107 and/or vehicle 101, such as autonomous driving applications, mapping applications, location-based service applications, navigation applications, content provisioning services, camera/imaging application, media player applications, social networking applications, calendar applications, and the like. In one embodiment, the application 109 may act as a client for the mapping platform 103 and perform one or more functions associated with generating priority ranking of satellite images alone or in combination with the machine learning system 119.

By way of example, the UE 107 is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 107 can support any type of interface to the user (such as "wearable" circuitry, etc.). In one embodiment, the UE 107 may be associated with the vehicle 101 or be a component part of the vehicle 101.

In one embodiment, the UE 107 and/or vehicle 101 are configured with various sensors for generating or collecting environmental image data (e.g., for processing by the mapping platform 103), related geographic data, etc. In one embodiment, the sensed data represent sensor data associated with a geographic location or coordinates at which the sensor data was collected. By way of example, the sensors may include a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture ground control point imagery, etc. for analysis), an audio recorder for gathering audio data, velocity sensors mounted on steering wheels of the vehicles, switch sensors for determining whether one or more vehicle switches are engaged, and the like.

Other examples of sensors of the UE 107 and/or vehicle 101 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the UE 107 and/or vehicle 101 may detect the relative distance of the vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the UE 107 and/or vehicle 101 may include GPS or other satellite-based receivers to obtain geographic coordinates from satellites for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 121 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the mapping platform 103, machine learning system 119, computer vision system 117, services platform 113, services 115, UE 107, vehicle 101, and/or content providers 125 communicate with each other and other components of the system 100 using well known, new or still developing protocols. In this context, a protocol includes a set of rules defining how the network nodes within the communication network 121 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 9:
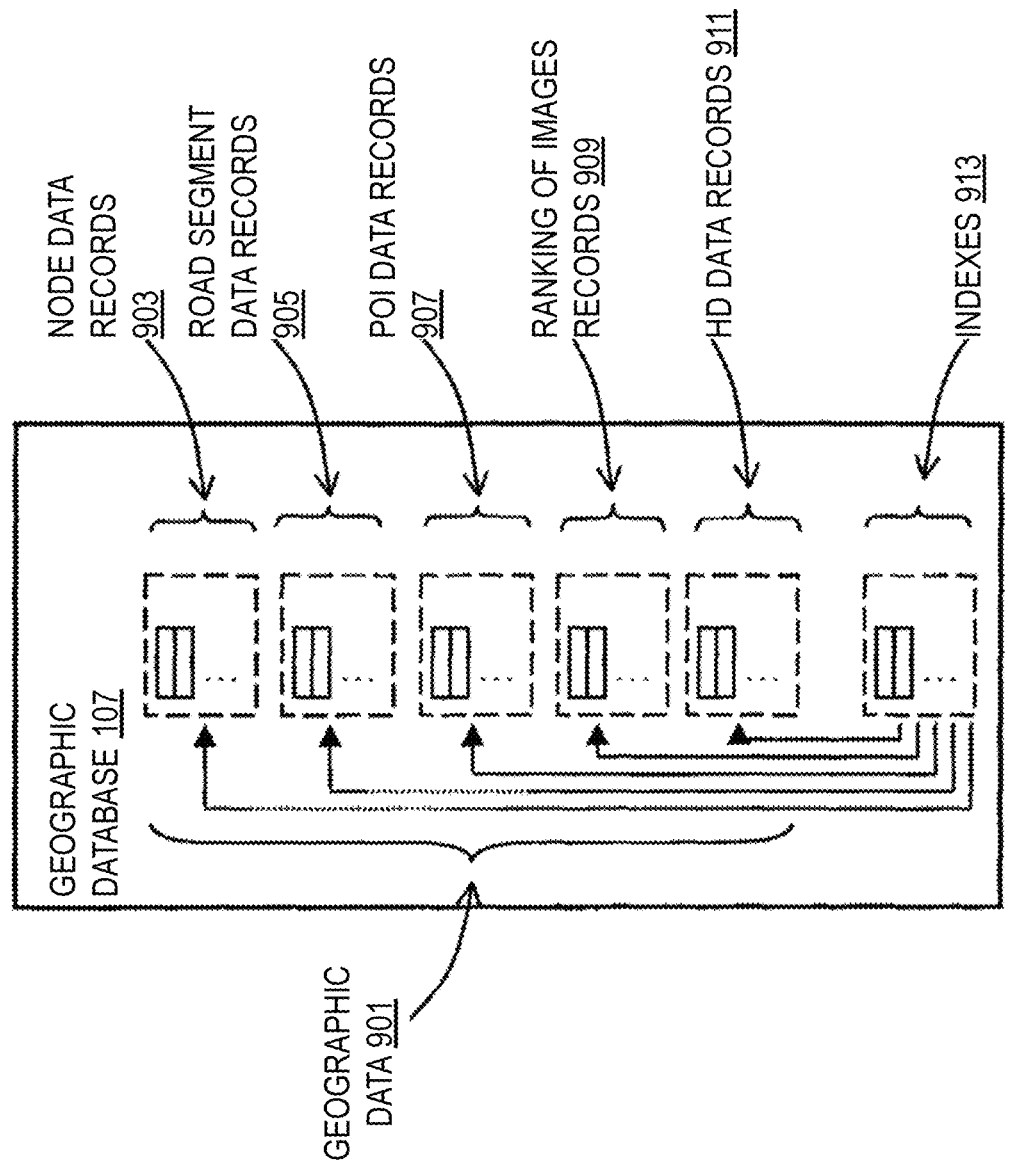
FIG. 9 is a diagram of a geographic database, according to one embodiment.

FIG. 9 is a diagram of a geographic database, according to one embodiment. In one embodiment, the geographic database 123 includes geographic data 901 used for (or configured to be compiled to be used for) mapping and/or navigation-related services, such as for video odometry based on the mapped features (e.g., lane lines, road markings, signs, etc.). In one embodiment, the geographic database 123 includes high resolution or high definition (HD) mapping data that provide centimeter-level or better accuracy of map features. For example, the geographic database 123 can be based on Light Detection and Ranging (LiDAR) or equivalent technology to collect billions of 3D points and model road surfaces and other map features down to the number lanes and their widths. In one embodiment, the HD mapping data (e.g., HD data records 911) capture and store details such as the slope and curvature of the road, lane markings, roadside objects such as sign posts, including what the signage denotes. By way of example, the HD mapping data enable highly automated vehicles to precisely localize themselves on the road.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 123.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 123 follows certain conventions. For example, links do not cross themselves and do not cross each other except at a node. Also, there are no duplicated shape points, nodes, or links. Two links that connect each other have a common node. In the geographic database 123, overlapping geographic features are represented by overlapping polygons. When polygons overlap, the boundary of one polygon crosses the boundary of the other polygon. In the geographic database 123, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 123 includes node data records 903, road segment or link data records 905, POI data records 907, ranking of images records 909, HD mapping data records 911, and indexes 913, for example. More, fewer or different data records can be provided. In one embodiment, additional data records (not shown) can include cartographic ("carto") data records, routing data, and maneuver data. In one embodiment, the indexes 913 may improve the speed of data retrieval operations in the geographic database 123. In one embodiment, the indexes 913 may be used to quickly locate data without having to search every row in the geographic database 123 every time it is accessed. For example, in one embodiment, the indexes 913 can be a spatial index of the polygon points associated with stored feature polygons.

In exemplary embodiments, the road segment data records 905 are links or segments representing roads, streets, or paths, as can be used in the calculated route or recorded route information for determination of one or more personalized routes. The node data records 903 are end points corresponding to the respective links or segments of the road segment data records 905. The road link data records 905 and the node data records 903 represent a road network, such as used by vehicles, cars, and/or other entities. Alternatively, the geographic database 123 can contain path segment and node data records or other data that represent pedestrian paths or areas in addition to or instead of the vehicle road record data, for example.

The road/link segments and nodes can be associated with attributes, such as functional class, a road elevation, a speed category, a presence or absence of road features, geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 123 can include data about the POIs and their respective locations in the POI data records 907. The geographic database 123 can also include data about places, such as cities, towns, or other communities, and other geographic features, such as bodies of water, mountain ranges, etc. Such place or feature data can be part of the POI data records 907 or can be associated with POIs or POI data records 907 (such as a data point used for displaying or representing a position of a city).

In one embodiment, the geographic database 123 can also include ranking of images records 909 for storing the identified feature correspondences (e.g., image-to-image correspondences, image-to-ground correspondences, etc.), camera geometry parameters, location corrected images, location corrected features, location corrected camera models/poses, as well as other related data used or generated according to the various embodiments described herein. By way of example, the ranking of images records 909 can be associated with one or more of the node records 903, road segment records 905, and/or POI data records 907 to support localization or visual odometry based on the features stored therein and the corresponding estimated quality of the features. In this way, the records 909 can also be associated with or used to classify the characteristics or metadata of the corresponding records 903, 905, and/or 907.

In one embodiment, as discussed above, the HD mapping data records 911 model road surfaces and other map features to centimeter-level or better accuracy. The HD mapping data records 911 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the HD mapping data records 911 are divided into spatial partitions of varying sizes to provide HD mapping data to vehicles 101 and other end user devices with near real-time speed without overloading the available resources of the vehicles 101 and/or devices (e.g., computational, memory, bandwidth, etc. resources).

In one embodiment, the HD mapping data records 911 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 911.

In one embodiment, the HD mapping data records 911 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 123 can be maintained by the content provider 125 in association with the services platform 113 (e.g., a map developer). The map developer can collect geographic data to generate and enhance the geographic database 123. There can be different ways used by the map developer to collect data. These ways can include obtaining data from other sources, such as municipalities or respective geographic authorities. In addition, the map developer can employ field personnel to travel by vehicle (e.g., vehicle 101 and/or UE 107) along roads throughout the geographic region to observe features and/or record information about them, for example. Also, remote sensing, such as aerial or satellite photography, can be used.

The geographic database 123 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 101 or UE 107, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing priority ranking of satellite images may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
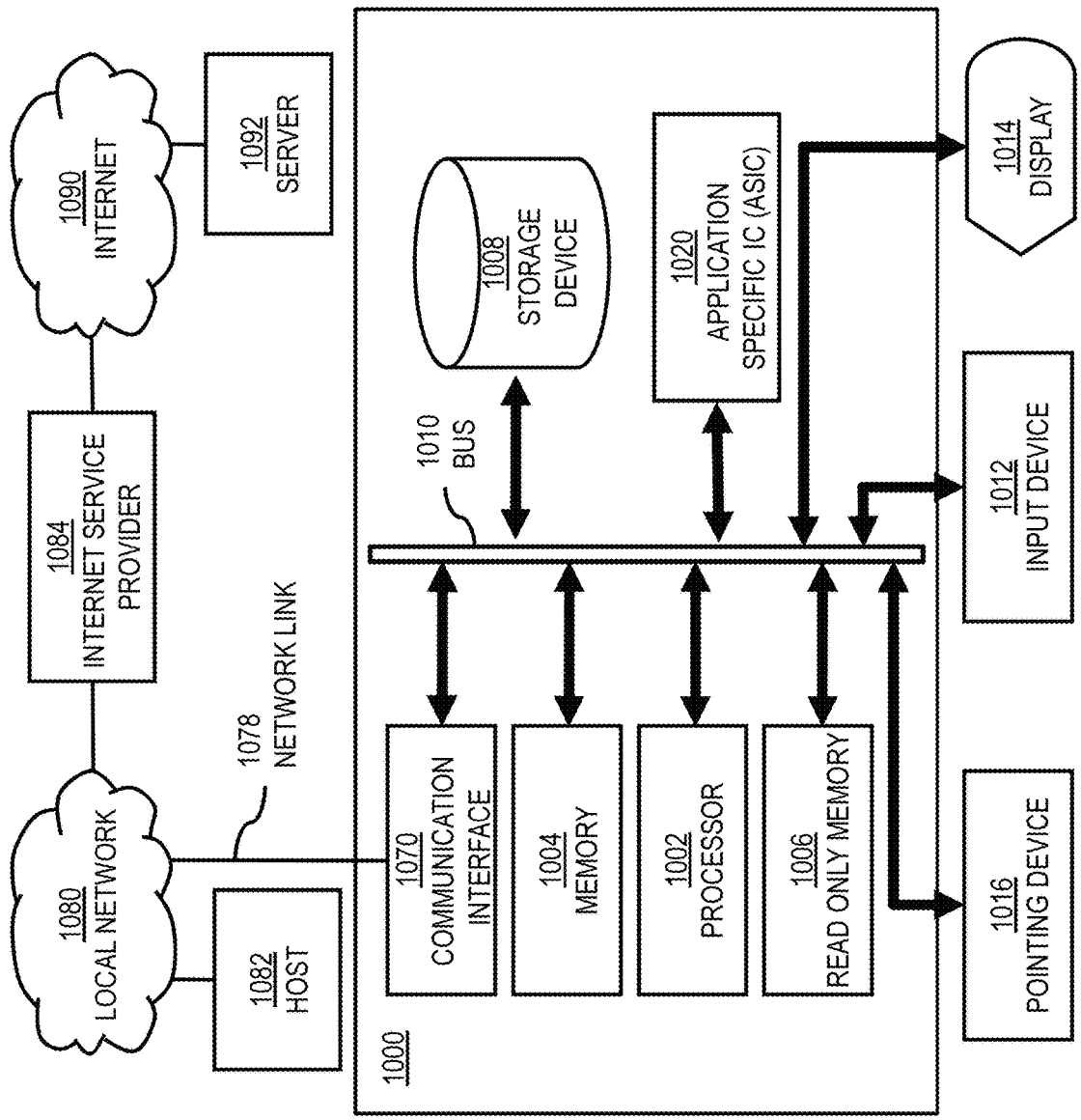
FIG. 10 is a diagram of hardware that can be used to implement an embodiment.

FIG. 10 illustrates a computer system 1000 upon which an embodiment of the invention may be implemented. Computer system 1000 is programmed (e.g., via computer program code or instructions) to provide priority ranking of satellite images as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1010 includes one or more parallel conductors of information so that information is transferred quickly among devices coupled to the bus 1010. One or more processors 1002 for processing information are coupled with the bus 1010.

A processor 1002 performs a set of operations on information as specified by computer program code related to provide priority ranking of satellite images. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or other dynamic storage device, stores information including processor instructions for providing priority ranking of satellite images. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for providing priority ranking of satellite images, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT) or a liquid crystal display (LCD), or plasma screen or printer for presenting text or images, and a pointing device 1016, such as a mouse or a trackball or cursor direction keys, or motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 121 for providing priority ranking of satellite images.

The term computer-readable medium is used herein to refer to any medium that participates in providing information to processor 1002, including instructions for execution. Such a medium may take many forms, including, but not limited to, non-volatile media, volatile media and transmission media. Non-volatile media include, for example, optical or magnetic disks, such as storage device 1008. Volatile media include, for example, dynamic memory 1004. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media.

Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 11 illustrates a chip set 1100 upon which an embodiment of the invention may be implemented. Chip set 1100 is programmed to provide priority ranking of satellite images as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to provide priority ranking of satellite images. The memory 1105 also stores the data associated with or generated by the execution of the inventive steps.

Figure 12:
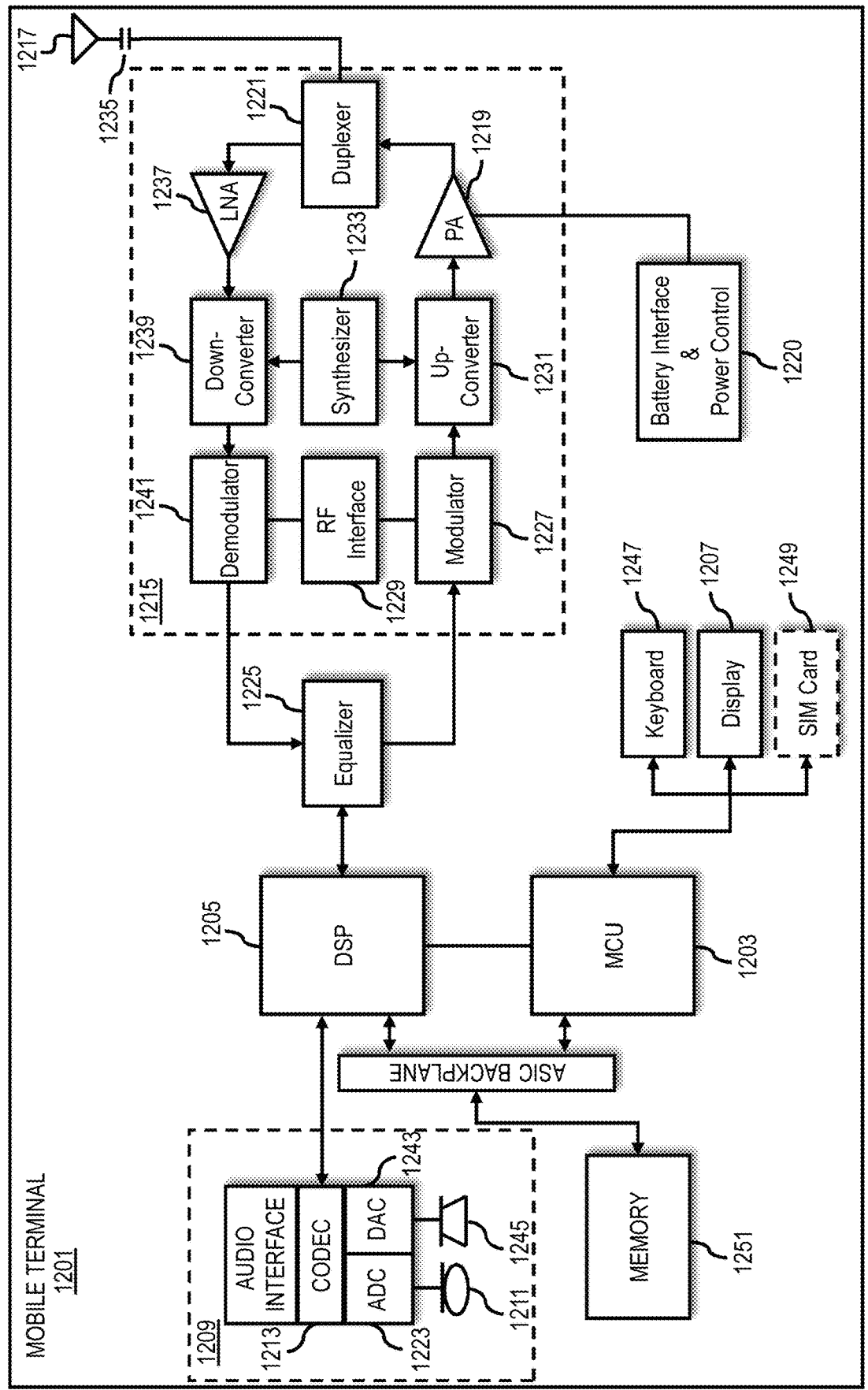
FIG. 12 is a diagram of a mobile terminal (e.g., handset, vehicle, or component thereof) that can be used to implement an embodiment.

FIG. 12 is a diagram of exemplary components of a mobile terminal (e.g., vehicle 101, UE 107, or component thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile station functions that offer automatic contact matching. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile station 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203—which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile station 1201 to provide priority ranking of satellite images. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the station. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile station 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1251 may be, but not limited to, a single memory, CD, DVD, ROM, RAM, EEPROM, optical storage, or any other non-volatile or non-transitory storage medium capable of storing digital data.

An optionally incorporated SIM card 1249 carries, for instance, important information, such as the cellular phone number, the carrier supplying service, subscription details, and security information. The SIM card 1249 serves primarily to identify the mobile station 1201 on a radio network. The card 1249 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   processing a plurality of images using a feature detector to determine a set of features on each image of the plurality of images;
   determining a count of feature correspondences between each pair of images of the plurality of images based on the set of features of said each image;

computing a ranking of the plurality of images based on the count of features correspondences between said each pair of images; and
providing the ranking of the plurality of images as an output for selecting one or more images of the plurality of images for feature creation.

2. The method of claim 1, further comprising:
determining an image acquisition parameter for one or more other images of the plurality of images, wherein the ranking indicates that the one or more other images are ranked above a threshold rank; and
providing the image acquisition parameter for collecting future imagery.

3. The method of claim 1, wherein the feature correspondences indicate that a feature of the set of features is detected by the feature detector in both a first image and a second image in said each pair of images.

4. The method of claim 1, further comprising:
creating a connected graph comprising a plurality of nodes,
wherein each node of the plurality of nodes respectively corresponds to said each image;
wherein an edge between each pair of nodes of the plurality of nodes corresponds to a connectivity weightage based on the count of feature correspondences, a confidence of the feature correspondences, or a combination thereof; and
wherein the ranking is computed based on the connected graph.

5. The method of claim 4, wherein the ranking is based on a sum of a plurality of outgoing edges of said each node.

6. The method of claim 5, further comprising:
iteratively updating the connectivity weightage of the plurality of outgoing edges based on the ranking associated with said each image to which the plurality of outgoing edges is connected.

7. The method of claim 1, further comprising:
determining a confidence of the feature correspondences between said each pair of images,
wherein the ranking is further based on the confidence of the feature correspondences.

8. The method of claim 7, wherein the ranking is based on a sum of the confidence of the feature correspondences for said each pair of images.

9. The method of claim 1, further comprising:
initiating the computing of the ranking of the plurality of images based on detecting that at least one new image has been added to the plurality of images.

10. The method of claim 1, wherein the plurality of images includes aerial imagery, and wherein the set of features includes one or more ground control points.

11. An apparatus comprising:
at least one processor; and
at least one memory including computer program code for one or more programs,
the at least one memory and the computer program code configured to, with the at least one processor, cause the apparatus to perform at least the following:
process a plurality of images using a feature detector to determine a set of features on each image of the plurality of images;
determine a count of feature correspondences between each pair of images of the plurality of images based on the set of features of said each image;
compute a ranking of the plurality of images based on the count of features correspondences between said each pair of images; and
provide the ranking of the plurality of images as an output for selecting one or more images of the plurality of images for feature creation.

12. The apparatus of claim 11, wherein the apparatus is further caused to:
determine an image acquisition parameter for one or more other images of the plurality of images, wherein the ranking indicates that the one or more other images are ranked above a threshold rank; and
provide the image acquisition parameter for collecting future imagery.

13. The apparatus of claim 11, wherein the feature correspondences indicate that a feature of the set of features is detected by the feature detector in both a first image and a second image in said each pair of images.

14. The apparatus of claim 11, wherein the apparatus is further caused to:
create a connected graph comprising a plurality of nodes,
wherein each node of the plurality of nodes respectively corresponds to said each image;
wherein an edge between each pair of nodes of the plurality of nodes corresponds to a connectivity weightage based on the count of feature correspondences, a confidence of the feature correspondences, or a combination thereof; and
wherein the ranking is computed based on the connected graph.

15. The apparatus of claim 14, wherein the ranking is based on a sum of a plurality of outgoing edges of said each node.

16. A non-transitory computer-readable storage medium carrying one or more sequences of one or more instructions which, when executed by one or more processors, cause an apparatus to perform:
processing a plurality of images using a feature detector to determine a set of features on each image of the plurality of images;
determining a count of feature correspondences between each pair of images of the plurality of images based on the set of features of said each image;
computing a ranking of the plurality of images based on the count of features correspondences between said each pair of images; and
providing the ranking of the plurality of images as an output for selecting one or more images of the plurality of images for feature creation.

17. The non-transitory computer-readable storage medium of claim 16, wherein the apparatus is caused to further perform:
determining an image acquisition parameter for one or more other images of the plurality of images, wherein the ranking indicates that the one or more other images are ranked above a threshold rank; and
providing the image acquisition parameter for collecting future imagery.

18. The non-transitory computer-readable storage medium of claim 16, wherein the feature correspondences indicate that a feature of the set of features is detected by the feature detector in both a first image and a second image in said each pair of images.

19. The non-transitory computer-readable storage medium of claim 16, wherein the apparatus is caused to further perform:
creating a connected graph comprising a plurality of nodes,
wherein each node of the plurality of nodes respectively corresponds to said each image;

wherein an edge between each pair of nodes of the plurality of nodes corresponds to a connectivity weightage based on the count of feature correspondences, a confidence of the feature correspondences, or a combination thereof; and wherein the ranking is computed based on the connected graph.

20. The non-transitory computer-readable storage medium of claim 19, wherein the ranking is based on a sum of a plurality of outgoing edges of said each node.

* * * * *